United States Patent
Theuerkorn (10) Patent No.: US 9,551,842 B2
(45) Date of Patent: Jan. 24, 2017

(54) FIBER OPTIC CONNECTOR WITH STRAIN RELIEF ASSEMBLY

(71) Applicant: CORNING OPTICAL COMMUNICATIONS LLC, Hickory, NC (US)

(72) Inventor: Thomas Theuerkorn, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/992,433

(22) Filed: Jan. 11, 2016

(65) Prior Publication Data

US 2016/0209602 A1 Jul. 21, 2016

Related U.S. Application Data

(60) Provisional application No. 62/103,664, filed on Jan. 15, 2015.

(51) Int. Cl.
*G02B 6/38* (2006.01)
*G02B 6/36* (2006.01)

(52) U.S. Cl.
CPC ............ *G02B 6/3887* (2013.01); *G02B 6/381* (2013.01); *G02B 6/3807* (2013.01); *G02B 6/3858* (2013.01); *G02B 6/3869* (2013.01); *G02B 6/3893* (2013.01)

(58) Field of Classification Search
CPC ..... G02B 6/3807; G02B 6/381; G02B 6/3858; G02B 6/3869; G02B 6/3883; G02B 6/3887; G02B 6/3893
USPC .................................................... 385/53–87
See application file for complete search history.

(56) References Cited

U.S. PATENT DOCUMENTS

| | | | |
|---|---|---|---|
| 4,795,229 A | 1/1989 | Abendschein et al. |
| 5,329,603 A | 7/1994 | Watanabe et al. |
| 5,390,272 A | 2/1995 | Repta et al. |
| 5,425,120 A | 6/1995 | Peterson et al. |
| 5,475,782 A | 12/1995 | Ziebol |

(Continued)

FOREIGN PATENT DOCUMENTS

| | | |
|---|---|---|
| EP | 0602958 B1 | 3/1999 |
| JP | 5-297246 A | 11/1993 |

(Continued)

OTHER PUBLICATIONS

International Search Report; PCT/US2016/013315; Mailed Apr. 19, 2016.

*Primary Examiner* — Akm Enayet Ullah
*Assistant Examiner* — Michael Mooney (57) ABSTRACT

A fiber optic connector includes a ferrule, a ferrule holder from which the ferrule extends, a housing in which the ferrule holder is received, and a connector body coupled to the housing. The connector body is configured to retain the ferrule holder within the housing. The fiber optic connector further includes a strain relief assembly comprising a support coupled to a rear portion of the connector body and a boot received over support. The support includes a first portion defining a front end of the support and a second portion defining a back end of the support, with the second portion having a stiffness less than the first portion. Additionally, the support and boot are formed from respective first and second materials, with the second material being less rigid than the first material.

20 Claims, 4 Drawing Sheets

(56) References Cited

U.S. PATENT DOCUMENTS

| | | | |
|---|---|---|---|
| 5,781,681 A | 7/1998 | Manning | |
| 6,374,022 B1 | 4/2002 | Parmigiani et al. | |
| 6,382,844 B1 | 5/2002 | Dubois et al. | |
| 6,932,515 B2 | 8/2005 | Ngo | |
| 7,490,997 B2 | 2/2009 | Verhagen | |
| 7,712,971 B2* | 5/2010 | Lee ..................... | G02B 6/3858 385/62 |
| 8,376,632 B2 | 2/2013 | Blackburn et al. | |
| 8,636,425 B2* | 1/2014 | Nhep ................... | G02B 6/3887 385/78 |
| 2001/0012428 A1 | 8/2001 | Nakajima et al. | |
| 2002/0181893 A1 | 12/2002 | White et al. | |
| 2010/0322568 A1 | 12/2010 | Zimmel et al. | |
| 2011/0002586 A1 | 1/2011 | Nhep | |
| 2012/0301085 A1 | 11/2012 | Grinderslev | |

FOREIGN PATENT DOCUMENTS

| | | |
|---|---|---|
| JP | 2006259631 | 9/2006 |
| WO | 2012125840 | 9/2012 |

\* cited by examiner

FIG. 7

FIBER OPTIC CONNECTOR WITH STRAIN RELIEF ASSEMBLY

PRIORITY APPLICATION

This application claims the benefit of priority under 35 U.S.C. §119 of U.S. Provisional Application Ser. No. 62/103,664, filed on Jan. 15, 2015, the content of which is relied upon and incorporated herein by reference in its entirety.

BACKGROUND

This disclosure relates generally to optical connectivity, and more particularly to fiber optic connectors having strain relief assemblies.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another connector (e.g., in an adapter), an optical fiber in the ferrule is positioned in a known, fixed location relative to the housing. This allows an optical connection to be established when the optical fiber is aligned with another optical fiber provided in the mating connector.

The housing and connector bodies (e.g., a retention/crimp body) of a fiber optic connector are often relatively rigid components so that the fiber optic connector can withstand a variety of forces during handling and use without affecting the optical connection that may be or has been established. Having a rigid components, however, presents design challenges elsewhere. For example, fiber optic cables upon which fiber optic connectors are installed are typically much less rigid than the connector bodies of the fiber optic connectors. The rapid transition from high stiffness to low stiffness may result in stress concentrations where the cable meets the connector body. Radial loads applied to the cable may then result in the cable bending (e.g., where the stresses are concentrated) beyond a minimum bend radius that must not be exceeded for the cable to function properly.

To address the above-mentioned challenge, a fiber optic connector typically includes a a flexible, strain-relieving boot that snaps onto a rigid portion of the fiber optic connector (e.g., the housing or connector body) and extends rearwardly over a portion of the cable. The boot provides a transition in stiffness between the fiber optic connector and the cable. Although many different boot designs have been proposed to properly provide this transition, new solutions are still desired. It can be difficult to address conflicting conditions at opposite ends of the boot, namely a high stiffness at the end of the boot coupled to the connector and a low stiffness at the end of the boot terminating on the cable. Failure to do so may result in stress concentration points that weaken the boot or otherwise still lead to unacceptable bending of the cable. Existing solutions may not adequately address these conflicting conditions, manufacturability challenges, space constraints, and other considerations.

SUMMARY

Embodiments of a fiber optic connector are disclosed below. According to one embodiment, a fiber optic connector includes a ferrule configured to support at least one optical fiber, a ferrule holder from which the ferrule extends, a housing in which the ferrule holder is received, and a connector body coupled to the housing. The connector body is configured to retain the ferrule holder within the housing. Additionally, the connector body has a front portion at least partially received in the housing and a rear portion at least partially outside of the housing. The fiber optic connector further includes a strain relief assembly comprising a support and a boot. The support is coupled to the rear portion of the connector body and includes a first portion defining a front end of the support, a second portion defining a back end of the support, and a transition region between the first and second portions. The second portion has a stiffness less than the first portion. The boot is received over the first portion of the support and extends rearwardly over the transition region and second portion. The support and boot are formed from respective first and second materials, with the second material being less rigid than the first material.

According to another embodiment, a fiber optic connector includes a ferrule configured to support at least one optical fiber, a ferrule holder from which the ferrule extends, a housing in which the ferrule holder is received, and a connector body coupled to the housing. The connector body is configured to retain the ferrule holder within the housing. Additionally, the connector body has a front portion at least partially received in the housing and a rear portion at least partially outside of the housing. The fiber optic connector further includes a strain relief assembly comprising a support coupled to the rear portion of the connector body and a boot received over support and extending rearwardly therefrom. The support and boot are formed from respective first and second materials, with the second material being less rigid than the first material. Additionally, the support includes at least one rib extending through a wall of the boot.

According to yet another embodiment, a fiber optic connector includes a ferrule configured to support at least one optical fiber, a ferrule holder from which the ferrule extends, a housing in which the ferrule holder is received, and a connector body coupled to the housing, and a shroud received over the housing and the connector body. The connector body is configured to retain the ferrule holder within the housing. Additionally, the connector body has a front portion at least partially received in the housing and a rear portion at least partially outside of the housing. The fiber optic connector further includes a strain relief assembly comprising a support coupled to the rear portion of the connector body and a boot received over support and extending rearwardly therefrom. The support includes a first portion and second portion, with the first portion defining a front end of the support and at least a first quarter of the support, and the second portion defining a back end of the support an at least a last quarter of the support. The second portion has a stiffness less than the first portion. A portion of the boot is positioned between the first portion of the support and the shroud. The support and boot are formed from respective first and second materials, with the second material being less rigid than the first material.

Embodiments of fiber optic cable assemblies are also provided below. The fiber optic cable assemblies include a fiber optic cable having at least one optical fiber. The fiber optic cable assemblies also include one of the fiber optic connectors disclosed herein installed on the fiber optic cable.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
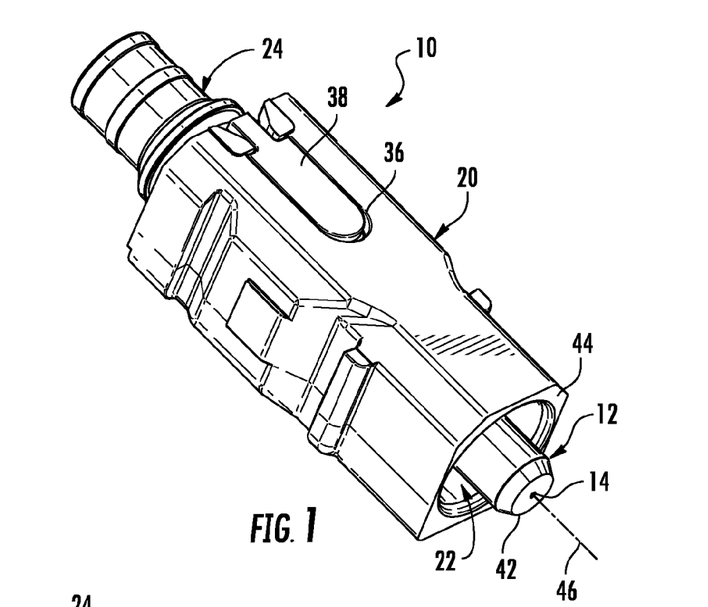
FIG. 1 a perspective view of an example of a fiber optic connector.

Various embodiments will be further clarified by examples in the description below. In general, the description relates fiber optic connectors and cable assemblies including the same. One example of a fiber optic connector 10 (also referred to as "optical connector 10", or simply "connector 10") is shown in FIG. 1. Although the connector 10 is shown in the form of a SC-type connector, the features described below may be applicable to different connector designs. This includes ST, LC, FC, MU, and MPO-type connectors, for example, and other single-fiber or multi-fiber connector designs.

Figure 2:
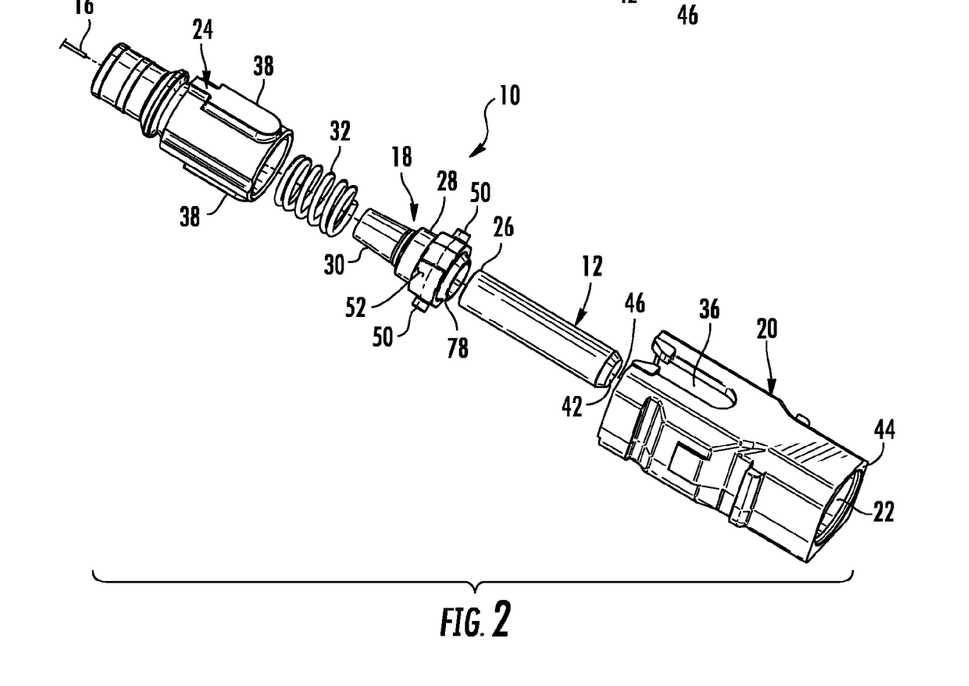
FIG. 2 is an exploded perspective view the fiber optic connector of FIG. 1.

As shown in FIGS. 1 and 2, the connector 10 includes a ferrule 12 having a ferrule bore 14 ("micro-hole") configured to support an optical fiber 16, a ferrule holder 18 from which the ferrule 12 extends, a housing 20 having a cavity 22 in which the ferrule holder 18 is received, and a connector body 24 (also referred to as "inner housing 24", "retention body 24", or "crimp body 24") configured to retain the ferrule holder 18 within the housing 20. More specifically, a back end 26 of the ferrule 12 is received in a first portion 28 of the ferrule holder 18 and is secured therein in a known manner (e.g., press-fit, adhesive, molding the ferrule holder 18 over the back end 26 of the ferrule 12, etc.). The ferrule 12 and ferrule holder 18 may even be a monolithic structure in some embodiments. For convenience, the term "ferrule assembly" may be used to refer to the combination of the ferrule 12 and ferrule holder 18, regardless of whether these elements are separate components secured together or different portions of a monolithic structure.

The ferrule holder 18 is biased to a forward position within the housing 20 by a spring 32, which extends over a second portion 30 of the ferrule holder 18 that has a reduced cross-sectional diameter/width compared to the first portion 28. The spring 32 also interacts with internal geometry of the connector body 24, which may be secured to the housing 20 using a snap-fit or the like. For example, FIGS. 1 and 2 illustrate a rear portion of the housing 20 having cut-outs or slots 36 on opposite sides so as to define a split shroud. The connector body 24 has tabs 38 configured to be snapped into the slots 36 and retained therein due to the geometries of the components.

Figure 3:
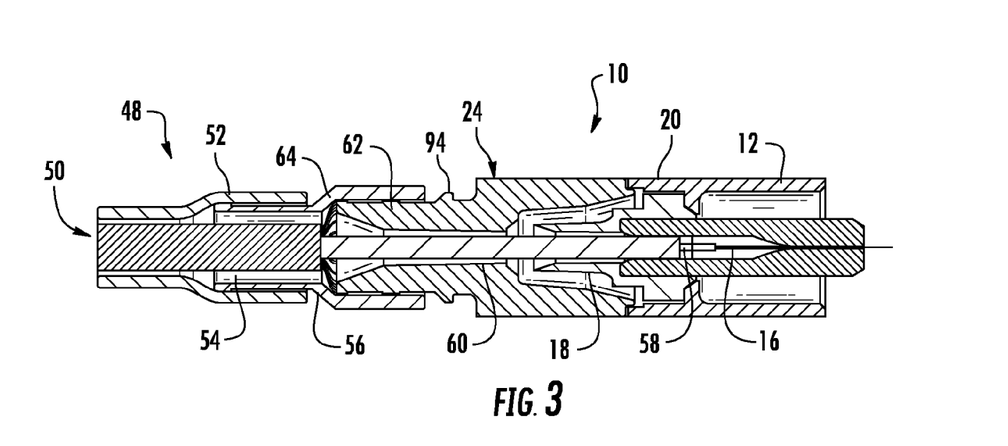
FIG. 3 is cross-sectional elevation view the fiber optic connector of FIG. 1 installed onto a fiber optic cable.

When the connector 10 is assembled as shown in FIG. 1, a front end 42 of the ferrule 12 projects beyond a front end 44 of the housing 20. The front end 42 presents the optical fiber 16 for optical coupling with a mating component (e.g., another fiber optic connector; not shown). Note that the ferrule 12 aligns the optical fiber 16 along a longitudinal axis 46. These aspects can be better appreciated with reference to FIG. 3, which shows how a fiber optic cable 50 (hereinafter "cable 50") including the optical fiber 16 can be terminated with the connector 10. In other words, the connector 10 can be installed on the cable 50 to form a fiber optic cable assembly 48. The cable 50 is merely an example to facilitate discussion. In the embodiment shown, the fiber cable 50 includes an outer jacket 52, inner jacket 54, strength members 56 in the form of aramid yarn, and the optical fiber 16, which itself has a coating 58 and a buffer layer 60 ("tight buffer"). Portions of the outer jacket 52 and inner jacket 54 have been removed from the optical fiber 16 to expose the strength members 56, which are cut to a desired length and placed over a rear portion 62 of the connector body 24. The strength members 56 are coupled to the connector body 24 by a crimp band 64 (also referred to as "crimp ring") that has been positioned over the optical fiber 16 and a portion of the strength members 56 and inner jacket 54. Again, the cable 50 is merely an example, as persons skilled in optical connectivity will appreciate how different cable designs may be terminated with the connector 10.

Figure 4:
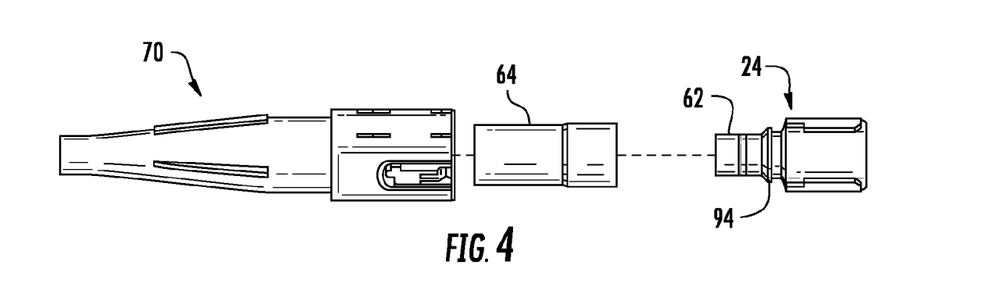
FIG. 4 is an exploded perspective view of a connector body, crimp band, and strain relief assembly for the fiber optic connector of FIG. 1.
Figure 5:
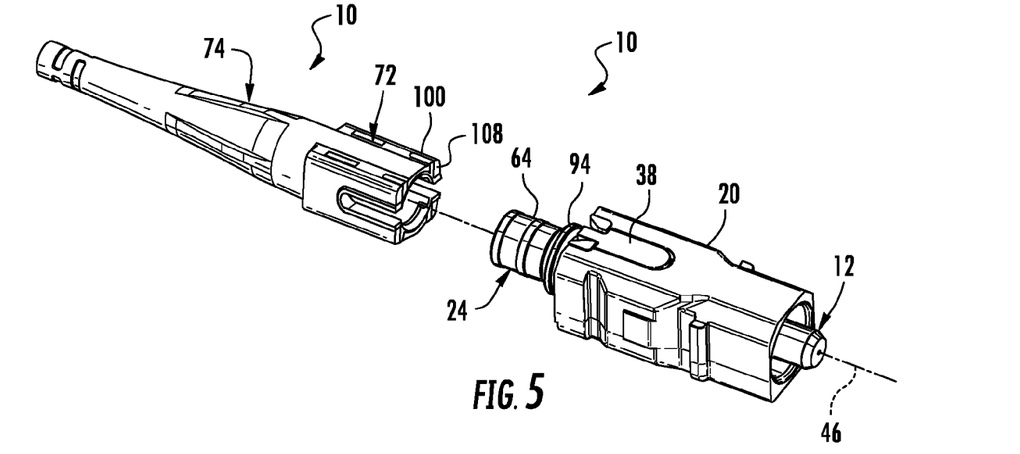
FIG. 5 is a perspective view similar to FIG. 1, but additionally showing the strain relief assembly of FIG. 4 exploded from the fiber optic connector.

In FIG. 4, the connector body 24 and crimp band 64 are shown in isolation with a strain relief assembly 70 of the connector 10. In FIG. 5, the strain relief assembly 70 is shown exploded from the connector 10 (with the crimp band 64 and cable 50 not shown for clarity). The strain relief assembly 70 is positioned over the crimp band 64 and coupled to the connector body 24 when the connector 10 is assembled. More specifically, and with additional reference to FIG. 6, the strain relief assembly 70 includes a support 72 configured to be coupled to the rear portion 62 of the connector body 24 and a boot 74 received over the support 72. The support 72 and boot 74 are formed from respective first and second materials, with the second material being less rigid than the first material. For example, in some embodiments the second material may be an elastomer, such as thermoplastic polyurethane, and the first material may be something having a higher modulus of elasticity and/or shear modulus, such as a polycarbonate or metal. The advantages of such an arrangement will be apparent after further describing other aspects of the strain relief assembly 70 below.

Figure 6:
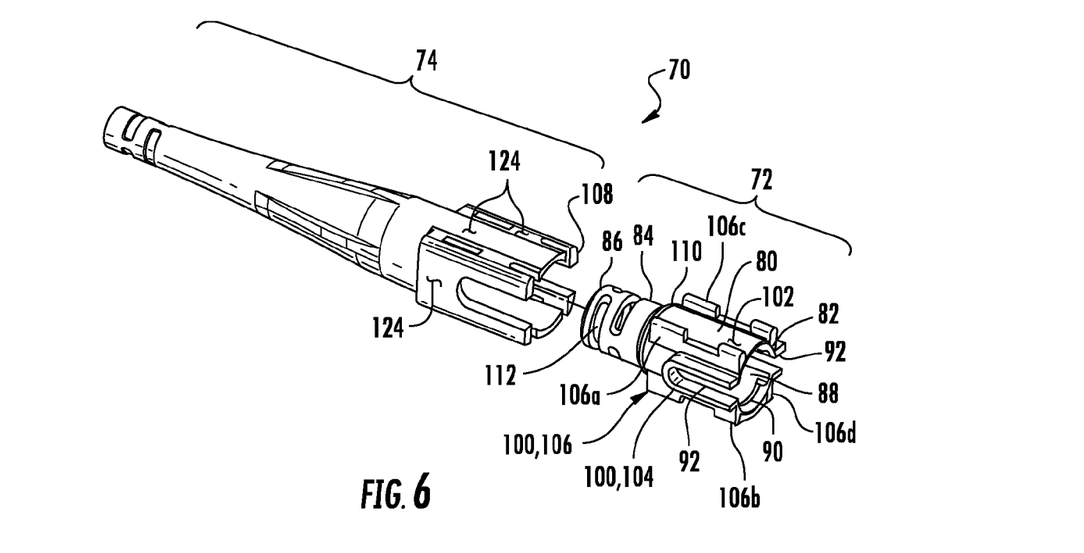
FIG. 6 is an exploded perspective of the strain relief assembly of FIG. 4.

Referring specifically to FIG. 6, the support 72 includes a first portion 80 defining a front end 82 of the support 72 and a second portion 84 defining a back end 86 of the support 72. A passage 88 extends through the support 72 between the front end 82 and back end 86. The first portion 80 represents at least the first quarter of the support 72 in some embodiments, or at least the first third, first half, or first two-thirds of the support 72 in some embodiments. To this end, the first portion 80 is configured to be coupled to the rear portion 62 of the connector body 24. One way in which the coupling may be achieved is by designing the dimensions and geometries of the support 72 and connector body 24 to provide a snap-fit connection. For example, the embodiment shown in the figures includes inwardly-extending latches or ridges 90 in the passage 88 adjacent the front end 82 of the support 72. Slots 92 extending rearwardly from the front end 82 are provided on opposite sides of the first portion 80. The slots 92 facilitate the first portion 80 flexing outwardly so that the latches 90 can be moved over a ridge 94 (FIGS. 3-5) on the rear portion 64 of the connector body 24. The relationship between the ridge 94 and latches 90 helps retain the support 72 (and, therefore, strain relief assembly 70) on the connector body 24 under normal loads.

The first portion 80 of the support 72 further includes at least one rib 100 (also referred to as a "fin") on an outer surface 102 of the support 72. Two types of ribs 100 are provided in the embodiment shown. First, walls 104 on the support 70 that border the slots 92 may be considered ribs. Second, projections 106 on the outer surface 102 that do not border the slots 92 may be considered ribs. Four projections 106 are shown in this example: first and second projections 106a, 106b on the side of the first portion including one of the slots 92, and third and fourth projections 106c, 106d on the side of the first portion including the other slot 92. The projections 106 are generally planar and aligned (e.g., the first and second projections 106a, 106b are co-planar, as are the third and fourth projections 106c, 106d) or parallel to each other (e.g., the first and second projections 106a, 106b are parallel with the third and fourth projections 106c, 106d). Other embodiments may include only one or more walls 104 or only one more projections 106 as the one or more ribs 100, and the ribs need not be aligned and/or parallel when multiple ribs are provided in some embodiments. As will be described in greater detail below, the ribs 100 extend through a wall 108 of the boot 74 when the boot 74 is received over the support 72.

Still referring to FIG. 6, the second portion 84 of the support 72 has a different geometry than the first portion 80. As such, a transition region or portion 110 is defined between the first and second portions 80, 84. The second portion 84 has a stiffness less than the first portion 80, which may be achieved by making the second portion 84 shorter in length and/or smaller in diameter/width than the first portion 80. Additionally, the second portion 84 may include structural features along its length that result in lower stiffness than the first portion 80. For example, the second portion 84 in the embodiment shown is cylindrical, aligned with the longitudinal axis 46 (FIG. 1), and has a plurality of lateral openings 112 along its length. The lateral openings 112 extend in a circumferential direction in the embodiment shown so as to comprise circumferentially-extending slots in the second portion 84. To this end, the second portion 84 appears "segmented". Other shapes and configurations are possible, however. Indeed, in alternative embodiments, the second portion 84 may not have any lateral openings or only have a single lateral opening extending circumferentially and/or axially.

Now referring to both FIGS. 5 and 6, the boot 74 is substantially longer than (e.g., at least twice the length of) the support 72 and similarly includes at least two portions having different geometries. At least a portion of the boot that is received over the first portion 80 of the support 72 has a rectangular or substantially rectangular profile when viewed along the longitudinal axis 46. The boot 74 also extends rearwardly from the support 72 and eventually terminates with a circular or substantially circular profile when viewed along the longitudinal axis 46. Accordingly, the boot 74 transitions from the rectangular or substantially rectangular profile to the circular or substantially circular profile as the boot 74 extends rearwardly from the first portion 80 of the support 72.

Figure 7:
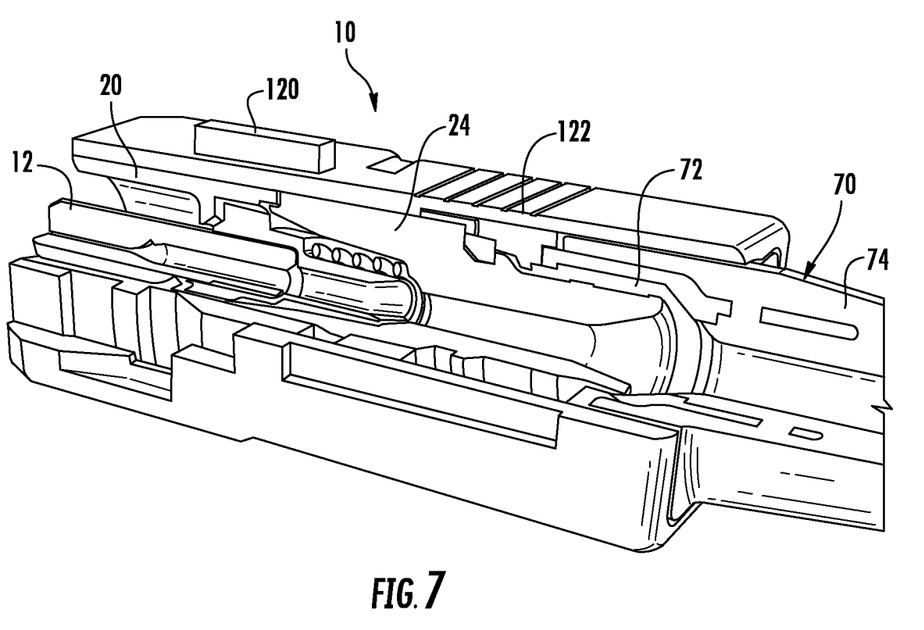
FIG. 7 is a perspective view, partially in cross-section, of the fiber optic connector of FIG. 1 including the strain relief assembly of FIG. 4 and a shroud.

The boot 74 may be over-molded onto the support 72 to be received thereon, although other methods of assembly will be appreciated. Advantageously, and as mentioned above, the rib(s) 100 on the first portion 80 of the support 72 extend through a wall 108 of the boot 74 at one or more locations. This can be better appreciated with reference to FIG. 7, which illustrates the connector 10 in an assembled condition and partially in cross-section. As shown in FIG. 7, the connector 10 may further include a shroud 120 received over the housing 20, connector body 24, and at least a portion of the strain relief assembly 70. The shroud 120 in the particular embodiment shown extends over the entire first portion 80 of the support 72 and, therefore, the portion of the boot 74 that is received over the first portion 80. The boot 74 extends from the front end 82 of the support and rearwardly over the first portion 80 in the embodiment shown, but other arrangements are possible. For example, the boot 74 may be received only over at least 75% of the first portion 80 of the support 72 in some embodiments, or only over at least 50% of the first portion 80 in some embodiments. Regardless, at least a portion of the boot 74 is positioned between the first portion 80 of the support 72 and the shroud 120. Inner surfaces 122 of the shroud 120 confront the outer surfaces 124 (FIG. 6) of the boot 74. Each rib 100 on the first portion 80 of the support 72 extends through the wall 108 of the boot 74 toward one of the inner surfaces 122. In some embodiments, the ribs 100 may even contact the associated inner surface 122 of the shroud 120.

By extending to or beyond an outer surface of the boot 74, the ribs 100 allow forces to be effectively transferred to the shroud 120 during use. For example, when a radial/side load is applied to the cable 50 (FIG. 3), the coupling between the strain relief assembly 70 and connector body 24 may experience less stress due to the force transfer to the shroud 120. This reduces the likelihood of the strain relief assembly 70 bending or otherwise deforming beyond an acceptable level (e.g., the minimum bend radius of the optical fiber 16).

Although the ribs 10 may be one feature that increases the support capability of the strain relief assembly 70 compared to conventional designs, on a more general level simply providing the strain relief assembly 70 with components formed from different materials—one being more rigid than the other—offers advantages with respect to stiffness. In particular, the rigid first material of the support 72 helps ensure that the portion of the strain relief assembly 70 that couples to the connector body 24 has a relatively high stiffness. This avoids a significant/sharp transition in stiffness between the connector body 24 and strain relief assembly 70, thereby reducing the concentration of stresses at the coupling when the cable 50 experiences side loads or other forces.

Moreover, the relatively high stiffness can be provided without sacrificing a smooth transition in stiffness at the other end of the strain relief assembly 70 between the end of the boot 74 and the cable 50. In other words, the strain relief assembly 70 is still able to transition to a sufficiently low stiffness in an acceptable amount of length due to its construction. The geometry of the support 72 is such that the second portion 84 has a lower stiffness than the first portion 80, thereby providing a transition in stiffness between the rigid material of the support 72 and the less rigid material of the boot 74. Thus, within the strain relief assembly 70 itself, the potential for stress concentrations due to sharp transitions in stiffness between the support 72 and boot 74 is reduced/minimized.

It should be noted that the above-mentioned advantages can each be provided without changing the spatial constraints of the strain relief assembly 70 and/or other components of the connector 10. For example, the shroud 120 of the connector 10 may be a conventional shroud, and the strain relief assembly 70 may be comparable in size to a conventional, monolithic strain relief structure (e.g., an elastomeric boot alone). Over-molding the boot 74 onto the support 72 is one way to achieve this advantage. Regardless of how the boot 74 is received and retained on the support 72, a sufficient length of the boot 74 is positioned between the first portion 80 of the support 72 and the shroud 120 so that the overall length of the strain relief assembly 70 is not significantly increased, if at all, compared to conventional designs. In the embodiment described above, the boot 74 extends from the front end 82 of the support 72 and rearwardly over the first and second portions 80, 84. In other embodiments, the boot 74 may be received over the support 72 to a lesser extent. For example, in some embodiments the boot 74 may only be received over at least 75% of the first portion 80, or only over at least 50% of the first portion 80.

Those skilled in the art will appreciate that other modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A fiber optic connector, comprising:
   a ferrule configured to support at least one optical fiber;
   a ferrule holder from which the ferrule extends;
   a housing in which the ferrule holder is received;
   a connector body coupled to the housing and configured to retain the ferrule holder within the housing, the connector body having a front portion at least partially received in the housing and a rear portion at least partially outside of the housing; and
   a strain relief assembly, comprising:
      a support coupled to the rear portion of the connector body, wherein the support includes a first portion defining a front end of the support, a second portion defining a back end of the support, and a transition region between the first and second portions, the second portion having a stiffness less than the first portion; and
      a boot received over the first portion of the support and extending rearwardly over the transition region and second portion, wherein the support and boot are formed from respective first and second materials, the second material being less rigid than the first material.

2. The fiber optic connector of claim 1, wherein the second portion of the support is substantially cylindrical and includes at least one lateral opening.

3. The fiber optic connector of claim 2, wherein the support extends along a longitudinal axis of the fiber optic connector, and further wherein the at least one lateral opening in the second portion of the support comprises a plurality of circumferentially-extending openings.

4. The fiber optic connector of claim 1, wherein the first material comprises an elastomer and the second material comprises a polycarbonate or metal.

5. The fiber optic connector of claim 1, wherein the boot is over-molded onto the first portion of the support.

6. The fiber optic connector of claim 1, wherein the first portion of the support includes at least one rib extending through a wall of the boot.

7. The fiber optic connector of claim 6, further comprising:
   a shroud received over the housing, connector body, and at least a portion of the strain relief assembly, wherein the at least one rib on the first portion of the support extends through the wall of the boot toward an inner surface of the shroud.

8. The fiber optic connector of claim 7, wherein the at least one rib on the first portion of the support contacts the inner surface of the shroud.

9. The fiber optic connector of claim 8, wherein the at least one rib comprises at least one planar projection extending from an outer surface of the first portion of the support.

10. The fiber optic connector of claim 1, wherein the first portion of the support includes at least one slot extending from the front end of the support, and further wherein the first portion of the support is coupled to the connector body by a snap-fit connection facilitated by the at least one slot.

11. The fiber optic connector of claim 10, wherein the at least one slot comprises opposed first and second slots.

12. The fiber optic connector of claim 1, wherein the strain relief assembly includes a passage extending through the support and boot, and further wherein an inner surface of the support and inner surface of the boot each define a portion of the passage and have complementary geometry where the passage transitions between them.

13. The fiber optic connector of claim 1, wherein at least a portion of the boot that is received over the first portion of the support has a rectangular or substantially rectangular profile when viewed along a longitudinal axis of the fiber optic connector, and further wherein the boot terminates with a circular or substantially circular profile when viewed along the longitudinal axis such that the boot transitions from the rectangular or substantially rectangular profile to the circular or substantially circular profile as the boot extends rearwardly from the first portion of the support.

14. The fiber optic connector of claim 1, wherein the boot extends from the front end of the support and rearwardly over the first portion, transition region, and second portion.

15. A fiber optic connector, comprising:
   a ferrule configured to support at least one optical fiber;
   a ferrule holder from which the ferrule extends;
   a housing in which the ferrule holder is received;
   a connector body coupled to the housing and configured to retain the ferrule holder within the housing, the connector body having a front portion at least partially received in the housing and a rear portion at least partially outside of the housing; and a strain relief assembly, comprising:
  a support coupled to the rear portion of the connector body; and
  a boot received over support and extending rearwardly therefrom, wherein the support and boot are formed from respective first and second materials, the second material being less rigid than the first material, and further wherein the support includes at least one rib extending through a wall of the boot.

16. The fiber optic connector of claim 15, further comprising:
  a shroud received over the housing, connector body, and at least a portion of the strain relief assembly, the at least one rib on the support extending through the wall of the boot toward an inner surface of the shroud.

17. A fiber optic connector, comprising:
  a ferrule configured to support at least one optical fiber;
  a ferrule holder from which the ferrule extends;
  a housing in which the ferrule holder is received;
  a connector body coupled to the housing and configured to retain the ferrule holder within the housing, the connector body having a front portion at least partially received in the housing and a rear portion at least partially outside of the housing;
  a shroud received over the housing and the connector body; and
  a strain relief assembly comprising:
    a support coupled to the rear portion of the connector body, wherein the support includes a first portion and second portion, the first portion defining a front end of the support and at least a first quarter of the support, the second portion defining a back end of the support an at least a last quarter of the support, the second portion having a stiffness less than the first portion; and
    a boot received over the support and extending rearwardly therefrom, wherein a portion of the boot is positioned between the first portion of the support and the shroud, and further wherein the support and boot are formed from respective first and second materials, the second material being less rigid than the first material.

18. The fiber optic connector of claim 17, wherein the first portion of the support includes at least one rib extending through a wall of the boot toward an inner surface of the shroud.

19. The fiber optic connector of claim 17, wherein the boot is received over support such that the boot extends from the front end of the support and rearwardly over the first and second portions.

20. A fiber optic cable assembly, comprising:
  a fiber optic cable having at least one optical fiber; and
  a fiber optic connector according installed on the fiber optic cable, wherein the fiber optic connector comprises:
    a ferrule configured to support at least one optical fiber;
    a ferrule holder from which the ferrule extends;
    a housing in which the ferrule holder is received;
    a connector body coupled to the housing and configured to retain the ferrule holder within the housing, the connector body having a front portion at least partially received in the housing and a rear portion at least partially outside of the housing; and
    a strain relief assembly, comprising:
      a support coupled to the rear portion of the connector body, wherein the support includes a first portion defining a front end of the support, a second portion defining a back end of the support, and a transition region between the first and second portions, the second portion having a stiffness less than the first portion; and
      a boot received over the first portion of the support and extending rearwardly over the transition region and second portion, wherein the support and boot are formed from respective first and second materials, the second material being less rigid than the first material.

* * * * *

UNITED STATES PATENT AND TRADEMARK OFFICE
CERTIFICATE OF CORRECTION

| | | |
|---|---|---|
| PATENT NO. | : 9,551,842 B2 | Page 1 of 1 |
| APPLICATION NO. | : 14/992433 | |
| DATED | : January 24, 2017 | |
| INVENTOR(S) | : Thomas Theuerkorn | |

It is certified that error appears in the above-identified patent and that said Letters Patent is hereby corrected as shown below:

In the Specification

In Column 1, Line 46, the word "a" before "rigid components" should be deleted.

In Column 1, Line 57, the text "includes a a flexible" should be read as "includes a flexible".

In the Claims

In Column 10, Line 14, the word "according" should be deleted.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*